Patented Nov. 15, 1927.

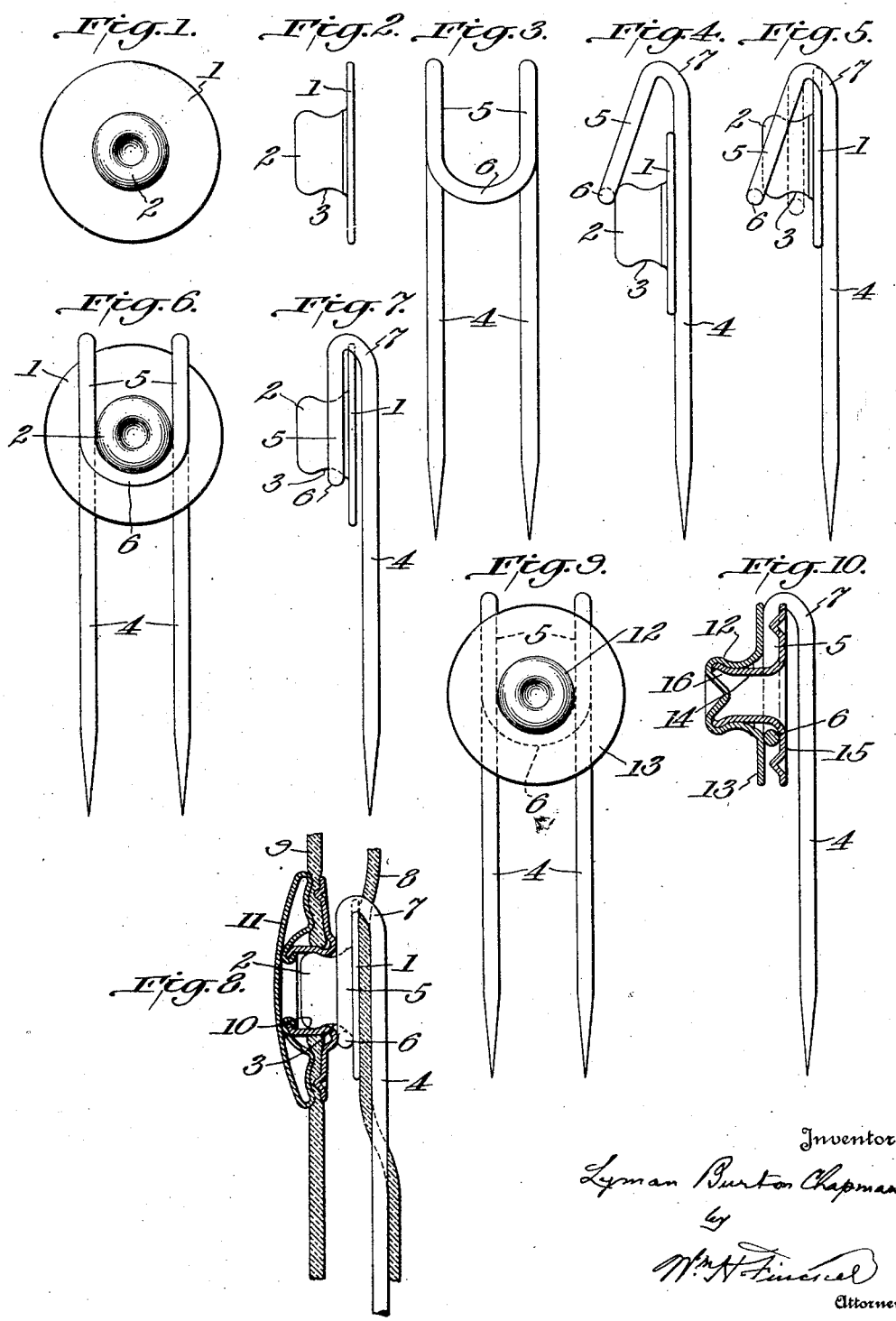

1,649,767

UNITED STATES PATENT OFFICE.

LYMAN BURTON CHAPMAN, OF WATERBURY, CONNECTICUT, ASSIGNOR TO SCOVILL MANUFACTURING COMPANY, OF WATERBURY, CONNECTICUT, A CORPORATION OF CONNECTICUT.

DOUBLE-PIN STUD FASTENER.

Application filed May 28, 1927. Serial No. 194,947.

The object of this invention is to mount a stud member of a snap-fastener upon a pin so that it may be struck at any desired place on an object, for cooperation with a complemental socket member on another object which is to be attached to the first-mentioned object.

The invention will be explained as used to secure covers to the upholstered parts of an automobile, although it is capable of other uses.

The invention consists of a double-pointed pin made of wire bent in U shape, the free ends being pointed and forming the limbs of the pin and the opposite or looped end being bent over and utilized as a head to engage the head of a stud and to confine the stud between itself and the upper portions of the limbs of the pin, the pin and stud being assembled either by the manufacturer thereof or the dealers or users, as I will proceed now to explain and finally claim.

In the accompanying drawings illustrating the invention, in the several figures of which like parts are similarly designated, Figure 1 is a plan view, and Fig. 2 is a side view of a rigid stud-member of a snap fastener. Fig. 3 is an elevation of a double-pointed pin having a looped head. Fig. 4 is a side elevation illustrating the first step in assembling the stud and pin. Fig. 5 is a side elevation illustrating in full lines the second step and in dotted lines the third step in such assembling. Fig. 6 is a front elevation, and Fig. 7 is a side elevation illustrating the assembled parts. Fig. 8 is a longitudinal section illustrating the use of the invention in connection with a resilient socket. Fig. 9 is a front elevation and Fig. 10 a longitudinal section illustrating a modification.

As shown in Figs. 1, 2, 4, 5, 6 and 7, the stud member may comprise a base flange 1, and an outwardly extending head 2 having the grooved or knurled neck portion 3, all of conventional form; the stud member being shown as of the rigid or non-resilient type, for use with a resilient socket member, in accordance with well-known snap-fastener practice.

The pin is of the double-pointed variety, having the pair of pointed limbs 4, with the looped end 5 bent over to form a head, and having the connecting bend 6, substantially as in the Boden, King & Chapman Patent, No. 1,604,801, granted October 26, 1926.

The stud and pin may be assembled by bending the looped end as in Fig. 4, then placing the rear side of the flange 1 against the limbs of the pin, with its head 2 in line with the loop in the head end of the pin, then moving the stud toward the bends 7 in the limbs of the pin until the flange comes into contact with such bends, and the head of the stud projects outwardly between the sides of the looped end, and then securing the stud in fixed position by closing down the looped end over the flange and head of the stud from the full line to the dotted line position, substantially as shown in Figs. 6 and 7.

Instead of furnishing the articles to the dealers or users in this finished state, they may be more cheaply supplied separately, and then assembled by the dealers or users, the only tool necessary being a pair of ordinary pliers.

Fig. 8 shows one of the pins struck in a part 8 which may represent the upholstery of an automobile, and a part 9 which may represent a cover for the upholstery. This cover has a resilient socket member 10 secured to it by a cap 11, substantially such as shown in the patent of Hyde & Simons, No. 757,196, granted April 12, 1904 and adapted to snap over and engage the stud, as shown in said Fig. 8.

In Figs. 9 and 10 another method is shown of securing the stud to the pin. In this showing, the stud 12 may be of the same construction as that previously described, but its flange 13 rests on the outer side of the looped end of the pin, and an attaching post 14 has a flange 15 resting on the inner side of the looped end and clinched within the head 16 of the stud. In other words, the looped end of the pin is clamped between the stud and its attaching member. The assembly may be made either before or after the looped end is bent over, preferably before, so as to facilitate the work.

The bends 7 serve as stops for the flange of the stud and the bend 6 serves as a stop for the head of the stud and thus these stops acting in opposite directions upon the stud not only position the stud in relation to the pin but restrain it from escape therefrom.

By the construction shown and described it is possible for the manufacturer to utilize standard pins and studs, and these could be sold at several cents less per gross than if assembled by him. It is designed to furnish the cover-maker with the sockets which he will attach to the cover, and along with the cover thus equipped the cover-maker will furnish the requisite number of pins to be set in the upholstery to register with the sockets in the cover.

Variations in the details of construction are permissible within the principle of the invention and the scope of the claims following.

What I claim is:—

1. A double pin stud fastener, having a looped head, and a stud clamped between the limbs of the pin and its head, with the head of the stud extending outwardly between the members of the looped head.

2. A double pin stud fastener, having a looped head, and a stud having a basal flange clamped between the limbs of the pin and its head, with the head of the stud extending outwardly between the members of the looped head.

3. A double pin stud fastener, having a looped head, and a stud having a basal flange clamped between the limbs of the pin and its head, with the head of the stud extending outwardly between the members of the looped head, the basal flange stopped by engagement with the bends in the pin next to the looped head.

4. A double pin stud fastener, comprising a pin having pointed limbs at one end and a looped head at its other end bent over from the limbs, and a flanged stud having a head, the flange of the stud being clamped between the looped head and the limbs of the pin and the bent-over portions between the head and the limbs and the head of the stud resting within the bend which connects the parts of the looped head, whereby the stud is restrained from escape from the pin in any direction.

5. A double pin stud fastener, having a double pointed pin made of wire bent in U shape, the free ends being pointed and forming the limbs of the pin and the opposite looped end being bent over and utilized as a head, and a flanged stud engaged with the head of the pin and confined therein against movement in any direction.

In testimony whereof I have hereunto set my hand this 24th day of May A. D. 1927.

LYMAN BURTON CHAPMAN.